(12) United States Patent
Kaneko et al.

(10) Patent No.: US 8,029,587 B2
(45) Date of Patent: Oct. 4, 2011

(54) STRAINERS FOR AIR CONDITIONING DEVICE

(75) Inventors: Yuji Kaneko, Anjo (JP); Yoshimi Watanabe, Hazu-gun (JP)

(73) Assignee: Aisin Seiki Kabushiki Kaisha, Kariya-shi (JP)

( * ) Notice: Subject to any disclaimer, the term of this patent is extended or adjusted under 35 U.S.C. 154(b) by 332 days.

(21) Appl. No.: 12/368,414

(22) Filed: Feb. 10, 2009

(65) Prior Publication Data

US 2009/0206018 A1    Aug. 20, 2009

(30) Foreign Application Priority Data

Feb. 14, 2008   (JP) ................................. 2008-033579

(51) Int. Cl.
*B01D 46/00* (2006.01)
(52) U.S. Cl. ................. 55/418; 55/486; 55/503; 55/504
(58) Field of Classification Search ................. 55/385.1, 55/486, 418, 503, 504, 505; 96/108, 117.5, 96/134, 139, 147, 118, 132, 416; 62/503, 62/509, 474, 55.5, 125; 138/45; 210/94, 210/175, 452, 283, 289, 448, 489, DIG. 6; 116/206, 227, DIG. 42
See application file for complete search history.

(56) References Cited

U.S. PATENT DOCUMENTS

| | | | | | |
|---|---|---|---|---|---|
| 2,325,657 | A | * | 7/1943 | Burkness | 210/94 |
| 4,946,598 | A | * | 8/1990 | Murphy et al. | 210/452 |
| 6,742,355 | B2 | * | 6/2004 | Ichimura et al. | 62/474 |
| 7,290,567 | B2 | * | 11/2007 | Hirakuni et al. | 138/45 |
| 2005/0145551 | A1 | * | 7/2005 | Ballet et al. | 210/175 |
| 2007/0000279 | A1 | * | 1/2007 | Koo | 62/474 |

FOREIGN PATENT DOCUMENTS

| | | |
|---|---|---|
| JP | 2001-46811 | 2/2001 |
| JP | 3402686 | 2/2003 |

* cited by examiner

*Primary Examiner* — Duane Smith
*Assistant Examiner* — Minh-Chau Pham
(74) *Attorney, Agent, or Firm* — Oblon, Spivak, McClelland, Maier & Neustadt, L.L.P.

(57) ABSTRACT

A strainer provided in a refrigerant piping of an air conditioning device through which refrigerant flows includes a cylindrical shell disposed in the refrigerant piping, a cage type filter which includes an opening at one end and a bottom at the other end facing with each other relative to the flowing direction of the refrigerant and a meshed circumferential portion for allowing the refrigerant to pass through, but preventing sludge to pass through an annular passage provided between an outer circumferential portion of the filter and an inner circumferential portion of the cylindrical shell for the refrigerant to flow through and a leading pipe inserted into the refrigerant piping for letting the refrigerant and sludge and having an opening disposed in the cylindrical shell adjacent and opposing to the bottom of the filter and an inner circumferential wall along which sludge flows.

5 Claims, 7 Drawing Sheets

Power transmission by motor

Closed type compressor

Fuel (City gas, LPG)

Power transmission by belt

Open type compressor

STRAINERS FOR AIR CONDITIONING DEVICE

CROSS REFERENCE TO RELATED APPLICATIONS

This application is based on and claims priority under 35 U.S.C. §119 to Japanese Patent Application 2008-033579, filed on Feb. 14, 2008, the entire contents of which are incorporated herein by reference.

FIELD OF THE INVENTION

The present invention relates to a strainer for an air conditioning device, and more particularly, to a strainer for a gas heat pump type air conditioning device.

BACKGROUND

FIG. 1 shows a schematic view of a general electric heat pump type air conditioning device. In this system, an electric motor is housed within a closed receptacle for driving the compressor. According to this type, when a deteriorated oil remains in refrigerant pipes or containers, insulation function may be damaged due to moisture or liquid remains in the deteriorated oil. In order to avoid such possible damages, the refrigerant pipes and containers are cleaned upon renewal construction of the heat pump.

FIG. 2 shows a schematic view of a general gas heat pump type air conditioning device. According to this type, different from the electric heat pump type, the compressor is of open type and is separately located from the gas engine (power source). Since this open and independent type structure would not damage any insulation, no cleaning process is needed upon renewal construction of the gas heat pump. For example, pipes and containers are not cleaned when the internal or outdoor unit is exchanged but using existing piping.

According to a patent document 1 (Japanese patent publication No. 3402686), a strainer is proposed which is suitable to be incorporated into a refrigerant recirculation circuit of an air conditioning device. This strainer is formed by a mesh type cage structure and is disposed in the refrigerant piping to catch any foreign materials flowing in the piping.

According to a patent document 2 (Japanese Patent Application publication No. 2001-46811), a filter is proposed which is suitable for filtering a high viscous fluid such as polymer liquid (acetyl-cellulose, acrylic liquid or polyester). This filter is formed with a cylindrical shape having a leading portion at one end thereof and a plurality of cylindrical filter members with different cross sectional sizes provided in pile on the common centerline. Each one end of the cylindrical filter member is detachably connected at one end of an adjacent inner side filter member and each the other end of the cylindrical filtering member is detachably connected to the other end of an adjacent outer side filter member.

When the strainer or filtering member according to the one disclosed in the patent document 1 is used for the air conditioning device, foreign materials may stuck on the mesh cage to reduce the effective refrigerant passing area, which may increase the pressure loss to eventually reduce the cooling function of the air conditioning device. Particularly, when sludge, which is composed by mixed foreign materials such as, remained deteriorated oil and oxidized film in the piping, is generated, the mesh portion of the strainer may be covered with such sludge to greatly reduce the refrigerant passing area.

The filter used in the patent document 2 has a complex structure as explained above and a big pressure loss is expected because of such complex structure if a mesh type is used for filtering.

A need thus exists for a strainer for the air conditioning device that can effectively catch the sludge or foreign materials passing through the piping to prevent or reduce the pressure loss.

SUMMARY OF THE INVENTION

According to an aspect of the present invention, a strainer for insertion into a refrigerant piping of an air conditioning device through which refrigerant flows, comprises a cylindrical shell disposed in the refrigerant piping, a cage type filter disposed in the cylindrical shell and formed with a mesh at a portion or the entire periphery thereof the filter having an opening at one end and a bottom at the other end facing with each other relative to the flowing direction of the refrigerant and a meshed circumferential portion between the opening and the bottom for allowing the refrigerant to pass through but preventing sludge to pass through, an annular passage provided between an outer circumferential portion of the filter and an inner circumferential portion of the cylindrical shell for the refrigerant to flow through and a leading pipe inserted into the refrigerant piping for letting the refrigerant and sludge and having an opening disposed in the cylindrical shell adjacent and opposing to the bottom of the filter and an inner circumferential wall along which sludge flows.

BRIEF DESCRIPTION OF THE DRAWINGS

The foregoing and additional features and characteristics of the present invention will become more apparent from the following detailed description considered with the reference to the accompanying drawings, wherein.

DETAILED DESCRIPTION

Figure 1:
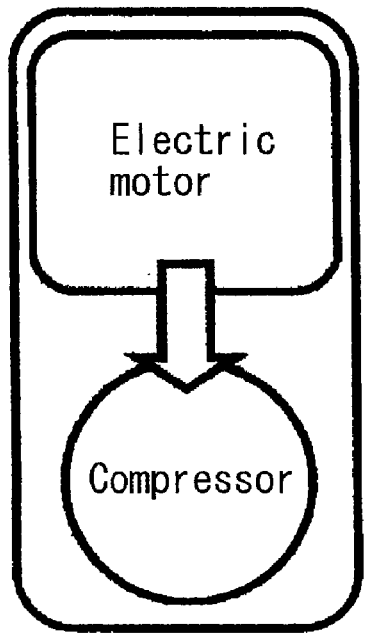
FIG. 1 is a schematic view of a general electric heat pump structure.
Figure 2:
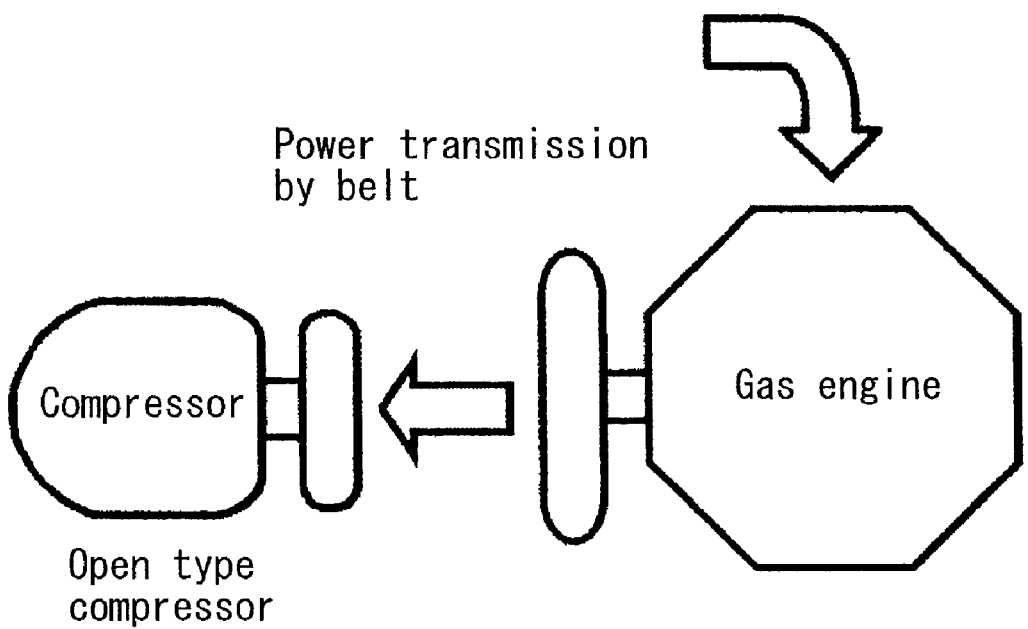
FIG. 2 is a schematic view of a general gas heat pump structure.
Figure 3:
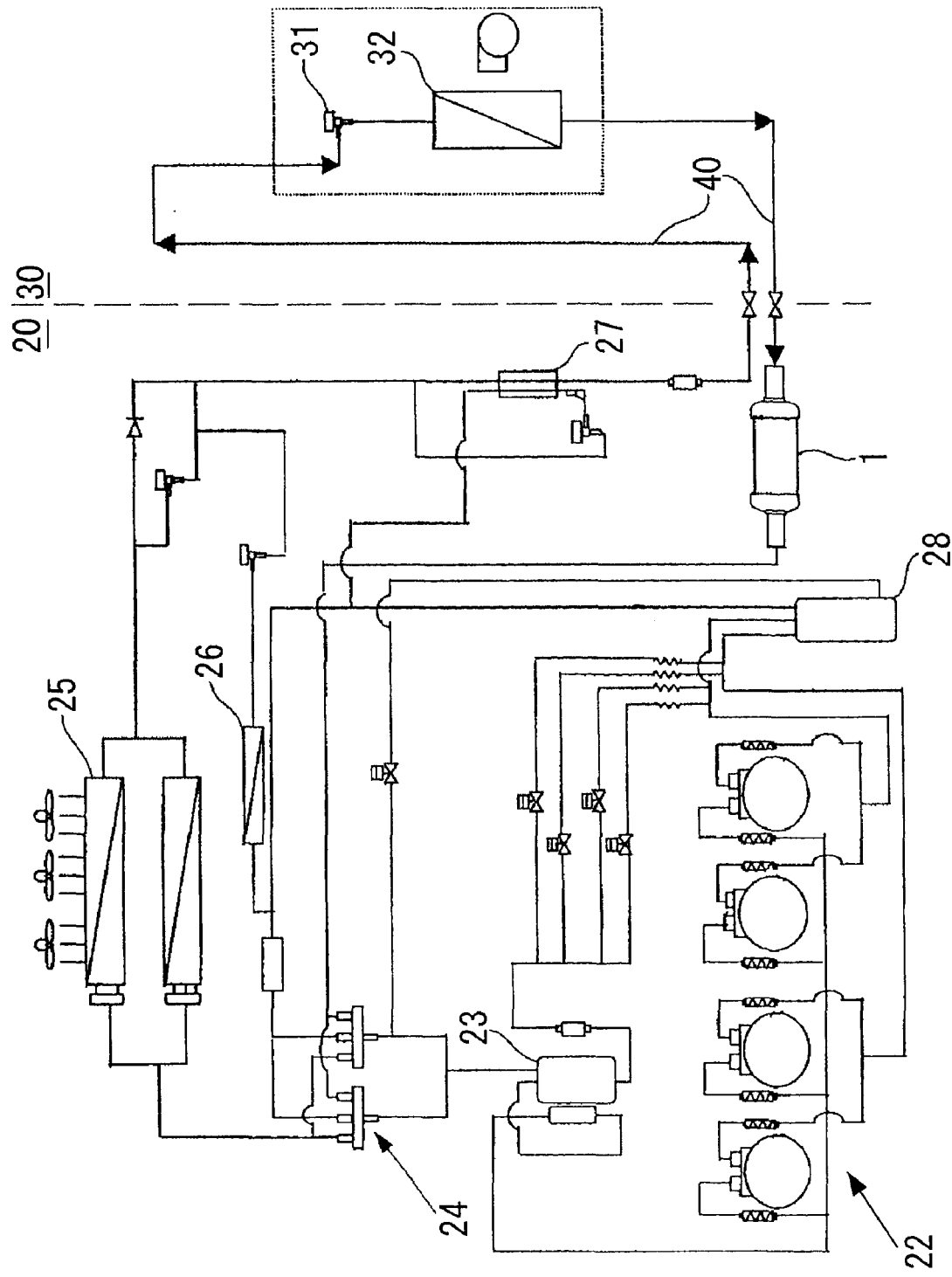
FIG. 3 is a view showing a system circuit of a gas heat pump air conditioning device with a strainer according to the invention incorporated into the circuit.

Referring now to the attached drawings, wherein FIG. 3 shows a system circuit of a gas heat pump type air conditioning device equipped with a strainer according to the invention.

The air conditioning device includes outdoor unit 20 and indoor unit 30 both being connected to each other by a refrigerant pipe 40 for flowing a refrigerant between the external and indoor units.

The outdoor unit 20 includes a plurality of compressors 22 (in the drawing, four compressor units are illustrated) ejecting high temperature and high pressure refrigerant driven by the gas engine, an accumulator 28 connected to one side of the compressors 22 for accumulating the refrigerant, an oil separator 23 connected to the other side of the compressors 22 for separating the refrigerant from the lubricating oil, a four-way valve 24 (in the drawing, two valves are illustrated) connected to one side of the oil separator 23 for changing over the flowing direction of the refrigerant depending on the air conditioning state such as cooling or heating, an external heat exchanger 25 (in the drawing, two valves are illustrated) and a waste heat recovery device 26 connected to one side of the four-way valve 24 and a super cooling coil 27 connected to the other side of the external heat exchanger 25 and the waste heat recovery device 26 for cooling operation.

The indoor unit 30 includes an expansion valve 31 connected to the other side of the super-cooling coil 27 and through which connected to the other side of the external heat exchanger 25 and an internal heat exchanger 32.

The basic operation of the air conditioning device illustrated in FIG. 3 will be explained hereinafter. Under cooling operation, the compressor 22 suctions and compresses refrigerant accumulated in the accumulator 28 and ejects high-temperature and high-pressure refrigerant to the external heat exchanger 25 through the four-way valve 24. The refrigerant is liquefied by the heat exchanger 25 and the liquefied refrigerant is expanded in the expansion valve 31. The temperature of the expanded refrigerant drops to cool off the air in the room through the internal heat exchanger 32. The refrigerant then returns to the accumulator 28.

Under heating operation, the compressor 22 suctions and compresses refrigerant accumulated in the accumulator 28 and ejects high-temperature and high-pressure refrigerant to the internal heat exchanger 32 through the oil separator 23 and through the four-way valve 24. The refrigerant heats the air in the room and then is expanded by the expansion valve 31 and finally returns to the accumulator 28 through the external heat exchanger 25 and the four-way valve 24.

Figure 4:
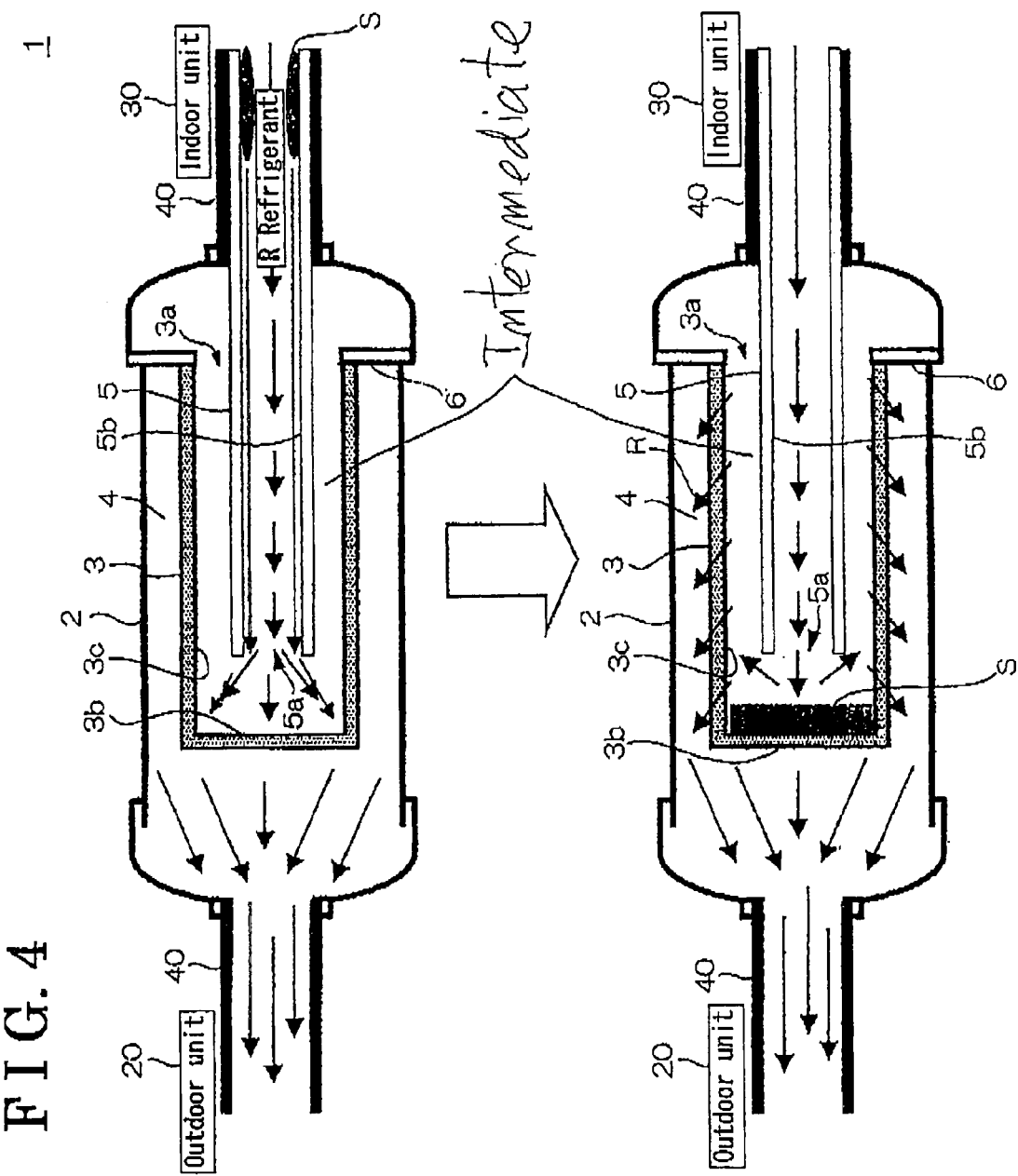
FIG. 4 is a cross sectional view of the strainer illustrated in FIG. 3 showing an operational explanation thereof.

The strainer 1 according to the invention will be explained hereinafter. The strainer 1 is connected to the refrigerant pipe 40. In more detail, the cross sectional view of the strainer 1 is illustrated in FIG. 4.

The strainer 1 includes a cylindrical shell 2 connected to the refrigerant pipe 40, a cage shaped filter member 3 with an opening 3a and a bottom 3b provided in the cylindrical shell 2, an annular passage 4 provided between the inner circumferential portion of the shell and an outer circumferential portion 3c of the filter member 3 and a leading pipe 5 disposed in the refrigerant pipe 40 in which sludge S (foreign materials) and the refrigerant R pass through. The cage shaped filter member 3 is formed with a mesh for passing through the refrigerant R and catching the sludge S at the mesh portion. The opening 3a of the filter member 3 and the leading pipe 5 is provided at the indoor unit side and the bottom 3b of the filter member 3 is positioned at the outdoor unit side of the refrigerant pipe 40 as shown in FIG. 3.

The opening 3a and the bottom 3b of the filter member 3 are oppositely arranged with respect to the flowing direction of the refrigerant R.

The leading pipe 5 includes an opening 5a adjacently and oppositely arranged to the bottom 3b of the filter member 3 and an inner circumferential wall 5b along which the sludge S flows. The leading pipe 5 is inserted into the filter member 3 from the opening 3a and the opening 5a of the leading pipe 5 opposes the inner surface of the bottom 3b of the filter member 3.

The strainer 1 further includes a reinforcement plate 6 (closing plate 6) in the cylindrical shell 2 for closing the annular passage 4 at one end thereof. The reinforcement plate 6 is provided at the opening 3a of the filter member 3 and no mesh is formed on the plate 6. The filter 3 is attached to the cylindrical shell 2 through the reinforcement plate 6. The plate 6 may be integrally formed with the filter member 3 or may be formed with a separate material from the filter member using a plate type flange member as shown in FIG. 4.

Function of the strainer 1 will be explained hereinafter upon renewal construction of the gas heat pump type air conditioning device with reference to the drawings, FIG. 3 and FIG. 4. When the mixture of the oxidized film, remained deteriorated oil and new type oil generates sludge, the air conditioning device is operated to cool off the air in the room and let the refrigerant R or the lubricating oil flow from the indoor unit side to the outdoor unit side to catch the sludge S at the filter member 3 upon renewal construction.

The sludge S is forced to flow along the inner circumferential wall 5b of the leading pipe 5 by the flow of the refrigerant R in the leading pipe 5 to be pushed out from the opening 5a of the leading pipe 5 into the filter member 3. As shown in the sectional view of the strainer 1 in FIG. 4, the sludge S in the leading pipe 5 under a condition shown in the upper side figure of the strainer 1 in FIG. 4 is pushed out from the pipe 5 to the bottom 3b of the filter member 3 as shown in the lower side figure of the strainer in FIG. 4. The sludge S is accumulated only on the bottom surface of the bottom 3b of the filter member 3 and the refrigerant R can flow through the inner circumferential meshed portion 3c of the filter member 3 and flows towards the refrigerant pipe 40 via the annular passage 4 keeping the effective passing area to prevent resistance increase during the refrigerant passing through the strainer 1.

Figure 5:
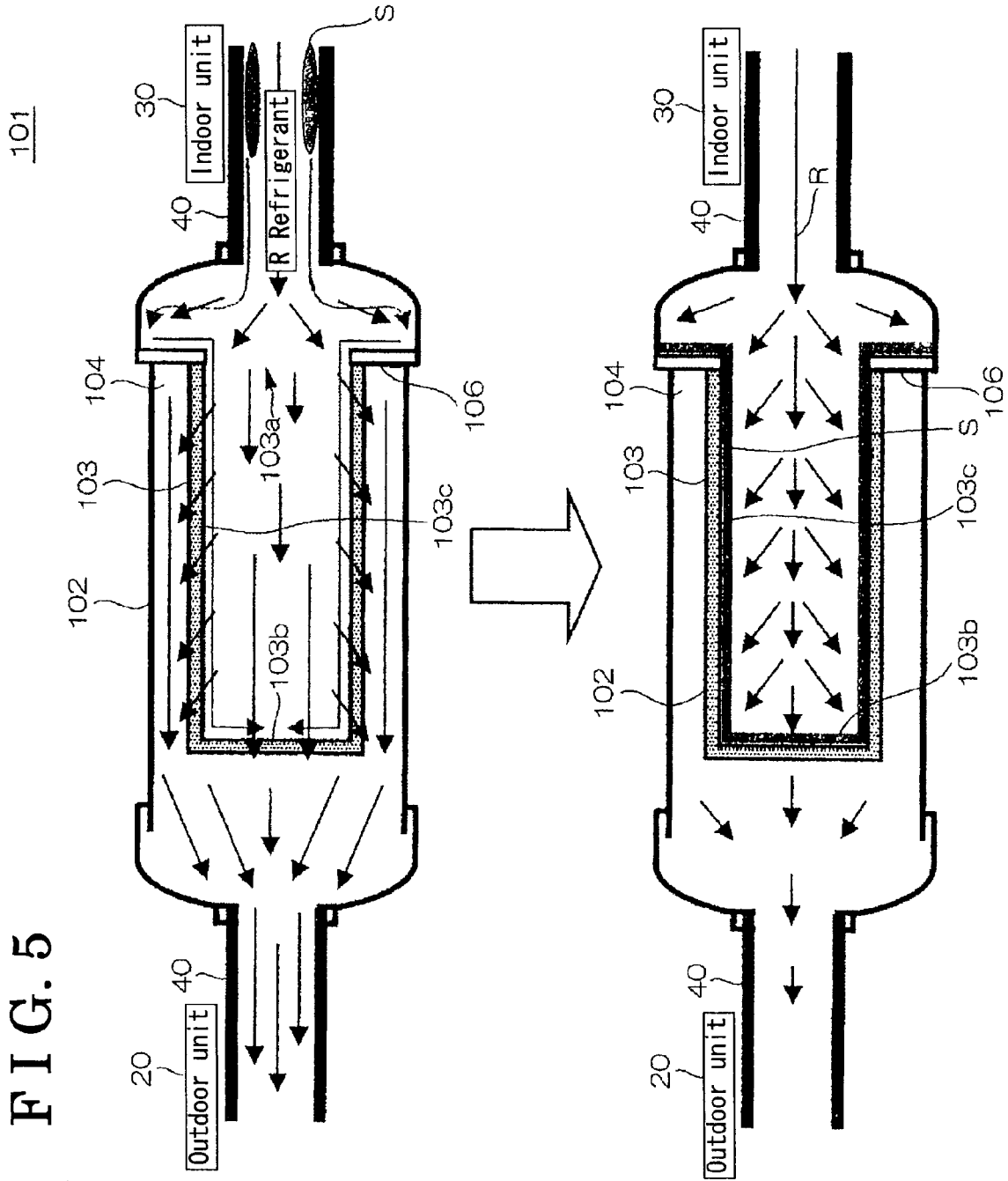
FIG. 5 is a cross sectional view of the strainer of a comparison example showing an operational explanation thereof.

FIG. 5 shows a cross sectional view of a strainer 101 showing as a comparison purpose with the strainer 1 according to the invention.

The strainer 101 includes a cylindrical shell 102 provided in the refrigerant pipe 40, a cage shaped filter member 103 with an opening 103a and a bottom 103b provided in the shell 102, an annular passage 104 provided between the inner circumferential portion of the shell and an outer circumferential portion 103c of the filter member 103 and a reinforcement plate 106 extending from the opening 103a of the filter member 103 to the cylindrical shell 102 in radial direction to close the one end side of the annular passage 104. The reinforcement plate 106 has no-mesh portion thereon.

The cage shaped filter member 103 is formed with a mesh for passing through the refrigerant R and catching the sludge S at the mesh portion. The opening 103a of the filter member 103 is provided at the indoor unit side and the bottom 103b of the filter member 103 is positioned at the outdoor unit side of the refrigerant pipe 40 as shown in FIG. 3.

The sludge S is forced to flow by the flow of the refrigerant R from the indoor unit side to the outdoor unit side in the refrigerant pipe 40 to be pushed out into the filter member 103. As shown in the sectional view of the strainer 101 in FIG. 5, the sludge S in the pipe 40 under a condition shown in the upper side figure of the strainer 101 in FIG. 5 is pushed out to the inner circumferential portion 103c and the bottom 103b of the filter member 103 as shown at the lower side figure of the strainer in FIG. 5. The sludge S is accumulated on the inner circumferential portion 103c as well as the bottom surface of the bottom 103b of the filter member 103 and the refrigerant R cannot flow through the inner circumferential meshed portion 103c of the filter member 103. The sludge S is further attached onto the reinforcement plate 106. After the entire circumferential portion and the bottom are covered or accumulated by the sludge S, the effective passing area of the refrigerant decreases greatly to increase the pressure loss at the strainer 101. This will eventually reduce the air conditioning function.

The dimensions of the strainer 1 shown in FIG. 4 will be explained hereinafter with reference to FIG. 6.

Figure 6:
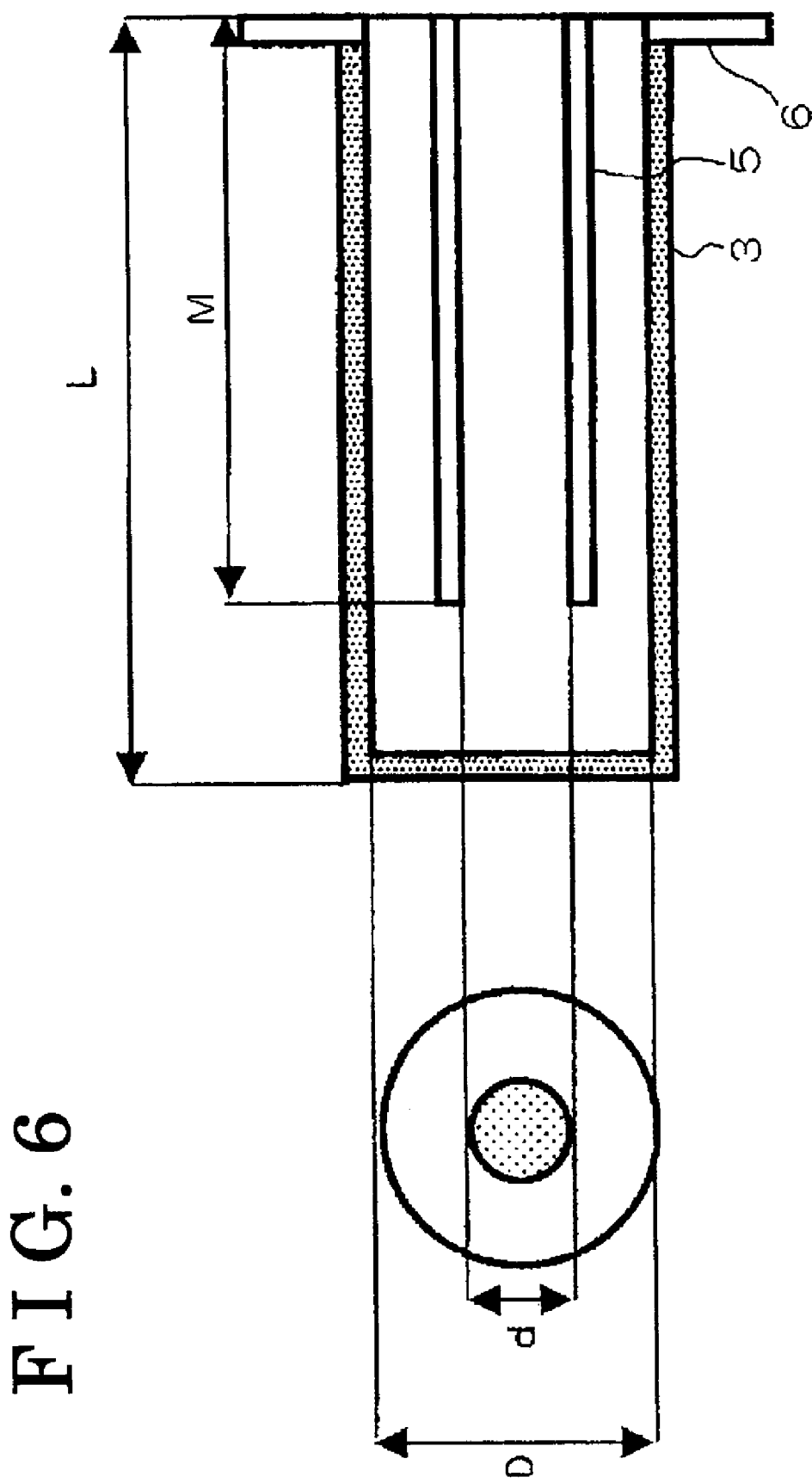
FIG. 6 is a dimensional relationship of the strainer illustrated in FIG. 4.

According to the various dimensions illustrated in FIG. 6, the axial length of the filter member 3 is determined as "L", the axial length of the leading pipe 5 as "M", inner diameter of the filter member 3 as "D" and inner diameter of the leading pipe as "d". In the experiment, the ratio of length "M" of the leading pipe 5 relative to the length "L" of the filter member 3 "M/L" is set to be variable and the ratio "d/D" of the inner diameter "d" relative to the inner diameter "D" is set to be 66%. The strainer 1 having the above dimension was connected to the refrigerant pipe 40 of the gas heat pump type air conditioning device shown in FIG. 3 and actually the air conditioning device was operated to measure the ratios of "M/L" and "d/D" and the relationship of the ratios with the pressure loss. The other experimental conditions are:

Flow amount of refrigerant: 1200 kg/h (corresponding to 56 kw capacity)

Sludge S: oxidized film 3.6 kg

Lubrication oil component ratio: NL10/SUNISO4GS=4L: 0.2L

Figure 7:
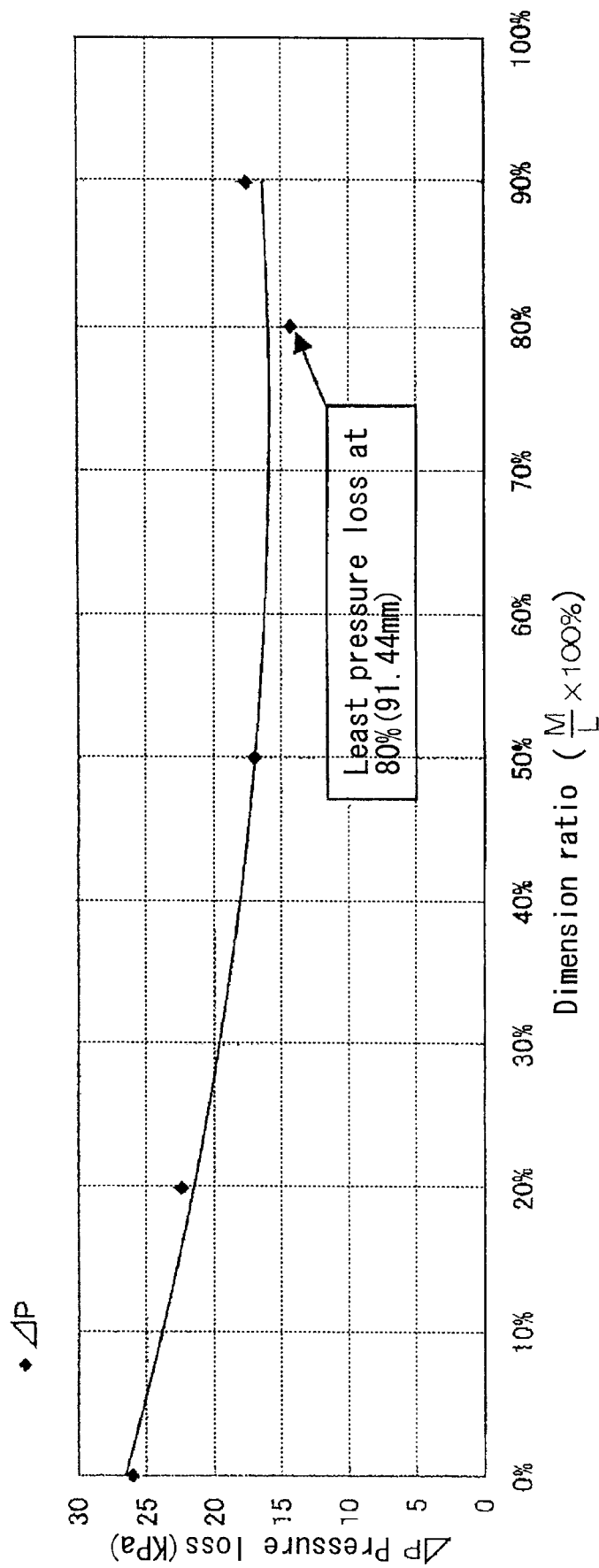
FIG. 7 is a graph showing a relationship between the pressure loss and the length ratio of a refrigerant pipe relative to a leading pipe according to the strainer in FIG. 4.

FIG. 7 is a graph showing relationship between the pressure loss and the axial length of the leading pipe 5 used in the strainer 1 shown in FIG. 4. According to the graph, the ratio M/L should be set to the value between 0.3 and 0.9 (30% and 90%) to have the least pressure loss, and preferably, between 0.5 and 0.9 (50% and 90%), the best value was between 0.8 and 0.9 (80% and 90%), particularly when the ratio M/L is 0.8, the pressure loss became the least. Further, according to the experiment, the diameter ratio d/D for effectively decreasing the pressure loss can be set as follows:

$$d \leq D/2$$

Figure 8:
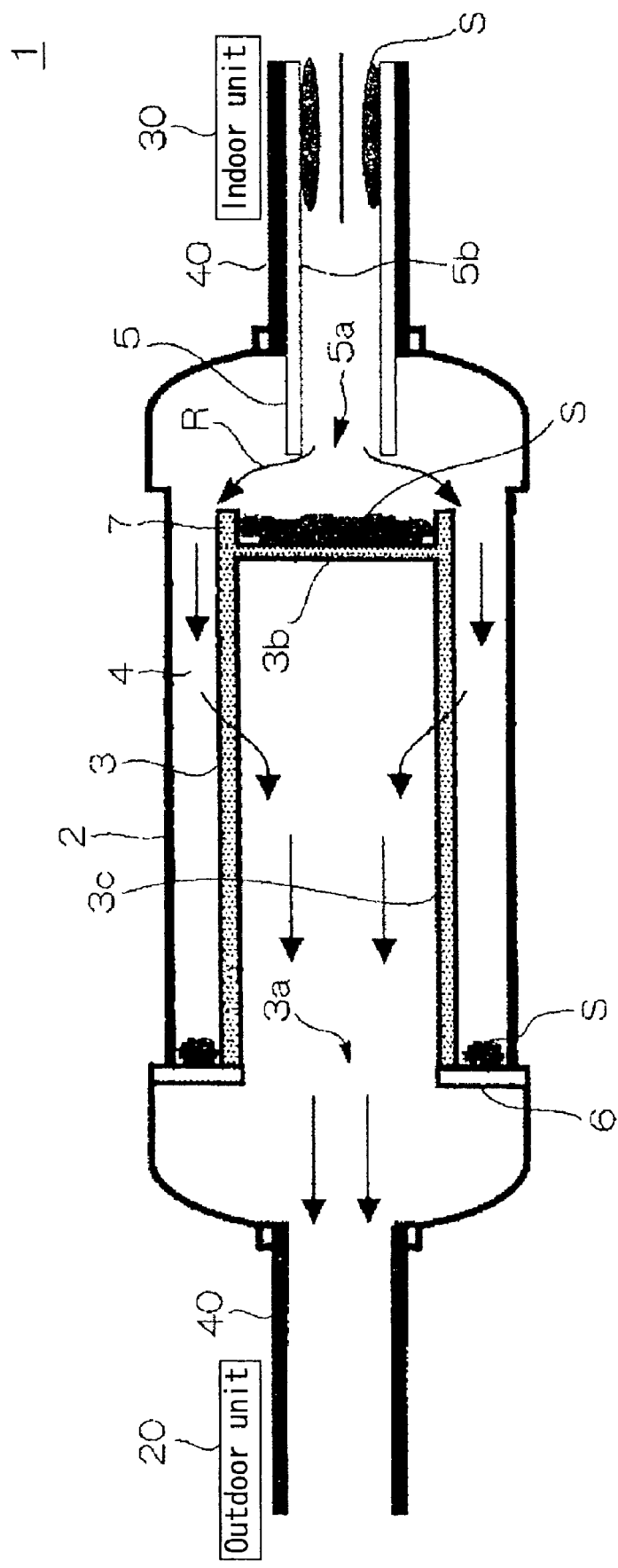
FIG. 8 is a cross sectional view of a strainer according to another embodiment of the invention.

FIG. 8 shows a strainer showing another embodiment of the present invention.

In FIG. 8, the strainer 1 is placed in opposite position of the strainer in FIG. 4 (the first embodiment) relative to the flowing direction of the refrigerant. In more detail, the filter member 3 is placed in the shell 2 with the opening 3a at the outdoor unit side and the bottom 3b at the indoor unit side facing the opening 5a of the leading pipe 5. The reinforcement plate 6 is provided at the opening 3a of the filter member 3 and extends in a radial direction to close the annular passage 4. The plate 6 is formed with non-mesh plate and functions as an attachment for the filer member to the shell 2. An annular projection 7 is provided at the bottom 3b of the filter member 3 and extend axially towards the opening 5a of the leading pipe 5 to form a cylindrical portion having a bottom (3b) and an opening facing to the opening 5a of the leading pipe 5 for receiving therein the sludge S flowing out from the leading pipe 5 along the inner circumferential portion 5b of the leading pipe 5. The projection 7 may be formed with an annular band at the bottom 3b of the filter member 3.

As shown in FIG. 8, the sludge S flowing from the indoor unit 30 flows through the leading pipe 5 and is caught at the cylindrical portion formed by the bottom 3b of the filter member 3 and the annular projection 7. The rest of the sludge S flows into the annular passage 4 but stopped by the reinforcement plate 6 and accumulated on the plate. Thus the refrigerant R can be flowing through the meshed filter member 3 passing through the circumferential portion 3c formed with a mesh without influencing on the pressure loss.

According to the first embodiment of the present invention, the strainer 1 can be used for the air conditioning device, particularly to a gas heat pump type air conditioning device shown in FIG. 3. Further, according to the strainer 1 of the embodiment of the invention, a plurality of oils can be allowed to flow in the refrigerant piping 40 and the air conditioning device can be freely designed without considering cleaning of refrigerant piping 40 upon renewal construction. Also the strainer according to the invention can be applicable to piping having relatively high sludge occurrence.

According to the strainer of the embodiment of the present invention, even when the sludge S is accumulated in the strainer 1 of the air conditioning device, the effective refrigerant passing area can be sufficiently assured and the size down or freedom of design choice is assured for the strainer or a mesh portion 3c or 3b of the filter member 3.

According to the strainer 1 for air conditioning device according to one embodiment of the invention, the leading pipe 5 is inserted into the cage type filter 3 through the opening 3a of the filter 3 and the opening 3a of the filter 3 is disposed adjacent and opposing to an inside surface of the bottom 3b of the filter 3.

According to the above feature of the embodiment of the invention, the sludge S is accumulated on the inside of the bottom 3b of the filter 3 to allow the flow of the refrigerant R through the annular passage 4 to assure the effective passing area of the refrigerant.

According to another feature of the embodiment of the invention, the strainer 1 for air conditioning device further includes an annular projection 7 provided at an outside surface of the bottom 3b of the filter and projecting towards the leading pipe 5. The opening 5a of the leading pipe 5 is opposed to the outside surface of the bottom 3b of the filter 3 enclosed by the projection 7.

According to the above feature of the embodiment of the invention, the sludge S is mainly accumulated in the area enclosed by the outside surface of the bottom 3b of the filter 3 and the projection 7 to keep the sufficient passing area for flowing of the refrigerant.

According to still further aspect of the embodiment of the invention, the strainer 1 further includes a reinforcement plate 6 provided between the filter 3 and the cylindrical shell 2 at the vicinity of the opening 3a of the filter 3 for closing one end of the annular passage 4.

According to the above feature of the embodiment of the invention, the sludge S cannot flow directly into the annular passage 4. Preferably, the reinforcement plate 6 is formed with non-mesh to stop or keep the sludge S thereon.

According to further aspect of the embodiment of the invention, the strainer 1 for air conditioning device is used for a gas heat pump type air conditioning device.

According to this feature, the sludge S can be caught by the filter 3 and lead to the leading pipe 5 from the refrigerant piping 40 by operating the air conditioning device under an operation mode, for example, cooling or defogging to allow the refrigerant flow from the indoor unit side to the outdoor unit side.

According to a feature of an embodiment of the invention, the filter 3 is formed with mesh on entire surface or a portion, for example at the circumferential portion 3c and the bottom 3b with non-mesh.

The principles, preferred embodiment and mode of operation of the present invention have been described in the foregoing specification. However, the invention intended for protection is not to be construed as limited to the particular embodiments disclosed. Further, the embodiments described herein are to be regarded as illustrative rather than restrictive. Variations and changes may be possible by others, and equivalents employed, without departing from the sprit of the

What we claim is:

1. A strainer for insertion into a refrigerant piping of an air conditioning device through which refrigerant flows, the strainer comprising:

a cylindrical shell disposed in the refrigerant piping;

a cage-shaped filter disposed in the cylindrical shell and formed with a mesh at a portion or the entire periphery thereof, the filter having an opening at one end and a bottom at the other end facing with each other relative to the flowing direction of the refrigerant and a meshed circumferential portion between the opening and the bottom for allowing the refrigerant to pass through but preventing sludge to pass through;

an annular passage provided between an outer circumferential portion of the filter and an inner circumferential portion of the cylindrical shell for the refrigerant to flow through; and a leading pipe inserted into the refrigerant piping for letting the refrigerant and sludge and having an opening disposed in the cylindrical shell adjacent and opposing to the bottom of the filter and an inner circumferential wall along which sludge flows, wherein the leadingpipe is inserted into the cage type filter through the opening of the filter and the opening of the filter is in close opposition to an inside surface of the bottom of the filter, and wherein an intermediate passage is defined between an inner circumferential portion of the filter and an outer surface of the leading pipe for allowing the refrigerant to pass through the filter from the end of the leading pipe to the annular passage.

2. The strainer according to claim 1, further comprising an annular projection provided at an outside surface of the bottom of the filter and projecting towards the leading pipe whereby the opening of the leading pipe is opposed to the outside surface of the bottom of the filter enclosed by the projection.

3. The strainer according to claim 1, further comprising a reinforcement plate provided between the filter and the cylindrical shell at the vicinity of the opening of the filter for closing one end of the annular passage.

4. The strainer according to claim 1, wherein the air conditioning device is a gas heat pump type air conditioning device.

5. The strainer according to claim 1, wherein a ratio of a length of the leading pipe relative to a length of the filter is between 0.3 and 0.9.

* * * * *